July 19, 1932. W. H. HEATON 1,868,142

HEATING DEVICE FOR THE WINDSHIELDS OF MOTOR VEHICLES

Filed Feb. 11, 1929

INVENTOR.
William H. Heaton.
BY
ATTORNEY.

Patented July 19, 1932

1,868,142

UNITED STATES PATENT OFFICE

WILLIAM H. HEATON, OF SHAWNEE, KANSAS

HEATING DEVICE FOR THE WINDSHIELDS OF MOTOR VEHICLES

Application filed February 11, 1929. Serial No. 339,027.

This invention relates to a heating device for keeping the windshields of motor vehicles and the like free of snow, ice, mist and so forth, in order that the driver may have a clear line of vision at all times, and thus largely eliminate the chance of accidents often caused by such foreign matter collecting upon the windshield.

A further object is to provide a device of this character in which the driver's vision is not obscured in any manner by the device.

Further objects are to provide a device which may be quickly applied to the motor vehicle in a simple and easy manner, and which is furnished with heat in any suitable manner, preferably from the internal combustion engine used for driving the vehicle.

The device, further, has no extraneous movable parts to wear and possibly get out of order when most needed, and is provided with means for regulating the amount of heat passing therethrough and directing it against the windshield at the most efficient angle, in conformance with the outside temperature and weather conditions.

With the above and other objects in view which will hereinafter appear, reference will now be had to the accompanying drawing, in which:

Fig. 3 is a vertical section taken on line III—III of Fig. 2, and looking in the direction of the arrow a.

Figure 1:
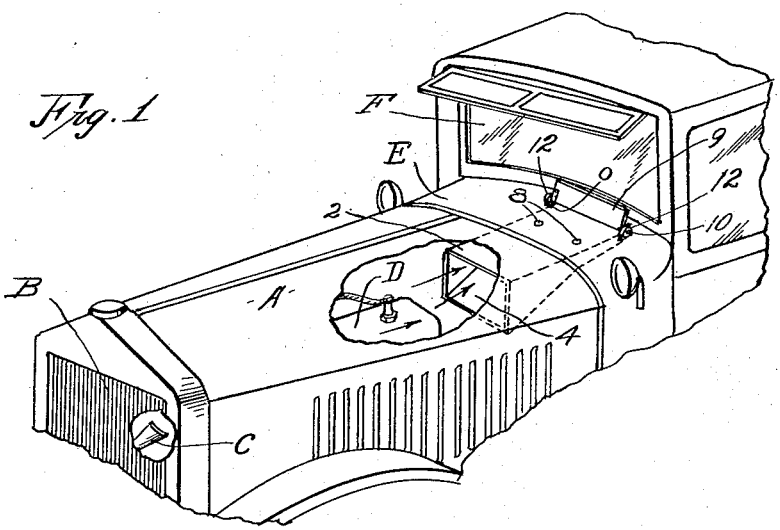
Figure 1 is a perspective view of the forward portion of a motor vehicle with certain parts thereof cut away to show the position of the present device upon said vehicle.
Figure 2:
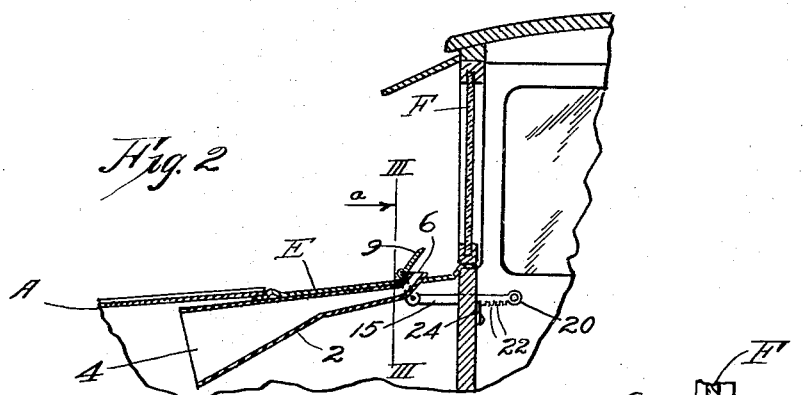
Fig. 2 is a fragmentary vertical section of a motor vehicle showing the device in position thereon in section.

Referring in detail to the different parts, A designates the hood of a motor vehicle, B the radiator, C the fan, D the engine, E the cowl, and F the windshield, all of which may be of any ordinary or preferred construction.

Referring more particularly to the parts forming the present invention, 2 designates a substantially funnel-shaped casing or member having a relatively large inlet 4 and a narrow, elongated, upturned outlet 6. Said casing 2 is held on the underside of the cowl E of the motor vehicle in any suitable manner, rivets 8 being shown for that purpose in the present instance. The outlet end 6 of said member 2 extends through the cowl E and a slight distance beyond, in order that any rain or moisture falling upon the cowl will be deflected past said opening 6 and not pass therein. The inlet 4 is at the front end of casing 2 and may extend forwardly beneath the hood A as shown.

Figure 4:
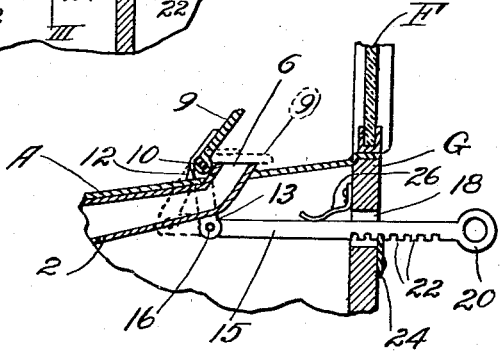
Fig. 4 is a fragmentary detail section showing the device in position upon a motor vehicle and the means for operating and adjusting said device.

9 designates a combination deflector and valve mounted upon a shaft 10, journaled in bearings 12, which latter are secured upon the cowl E. Said deflector 9 is so positioned that it may be adjusted to deflect the current of heated air issuing from the outlet 6 at any desired angle against the windshield F. When desired said deflector 9 may be adjusted to entirely close the opening 6, as shown in the dotted line position on Fig. 4. This is done in order that the current of heated air may be cut off from the windshield when not needed.

Figure 3:
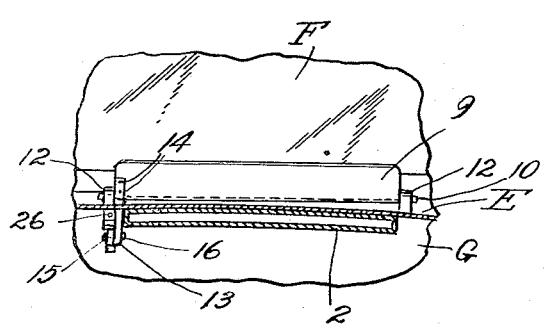

The mechanism for adjusting the deflector 9 to different positions, or entirely closing the same, is as follows: 13 designates a depending lever fixedly secured to the deflector 9 as by rivets 14 or other suitable means, as disclosed by Fig. 3. Said lever 13 extends through an opening O in the cowl and is pivotally secured at its lower end to a lever 15, as indicated at 16. The lever 15 is slidably mounted in an opening 18 in the instrument board G of the motor vehicle and has an enlarged terminal 20 to form a hand hold for operating said lever. A plurality of notches 22 are formed on the under surface of the lever 15, any one of which is adapted to engage a stop 24 secured to the instrument board G to hold said lever 16 in any of its adjusted positions. In order to firmly hold the lever 16 down upon the stop 24 while the car is traveling on the road, a spring 26 is employed to bear down upon said lever 16, said spring being secured to the inner side of the instrument board in any suitable manner.

In practice, the fan C draws air in through the radiator B and forces it back over the engine D. The air in its passage over the engine is heated and enters the enlarged intake 4 of the casing 2 and passes through said casing and out of the outlet 6. As the heated air leaves said outlet 6 it strikes the deflector 9 and is directed backwardly and upwardly thereby against the windshield F and thus supplies a continuous current of heated air against the windshield and effectually removes any ice, snow or mist that tends to collect upon said windshield.

From the foregoing it will be understood that I have provided a practical and efficient device well adapted for the purpose intended, and while I have shown the preferred embodiment of said invention I reserve all rights to such changes and modifications as properly fall within the spirit and scope of the invention as claimed.

Having thus described my invention, what I claim and desire to secure by Letters Patent, is:

1. In a device of the character described, means for collecting heated air from the engine of a motor vehicle, a deflector for directing the heated air so collected at an angle against the windshield of said vehicle, a lever fixedly secured to said deflector, and a second lever pivotally secured to the first lever for adjusting the deflector.

2. In a device of the character described, a casing for collecting heated air from the engine of a motor vehicle, deflecting means arranged at the outlet end of said member for regulating and directing the passage of heated air therethrough, a lever secured to said deflector, a second lever pivotally secured to the first lever for adjusting said deflector at different angles, and means for locking said lever in any of its adjusted positions.

3. In a windshield heater, an inclined tunnel for transferring hot air from the engine space under the hood to a point above the hood in front of the windshield, said tunnel having inlet and outlet openings, said outlet opening having a cover hinged at its front edge and adapted when open to cause the hot air to flow in an inclined path upon the windshield.

4. In an automotive vehicle having an engine compartment containing a substantial amount of heated air, a transparent windshield at the rear of and above said compartment, a hood and cowl structure normally enclosing said compartment, and means for directing a stream of heated air from said compartment in front of and in contact with said windshield, said means including an opening in the rear portion of said hood and cowl structure adjacent said windshield and arranged to receive heated air from said compartment, and means for varying the effective discharge area of said opening.

5. An anti-frost device for automobile windshields comprising an apertured engine covering, deflector means for directing heated air from the engine and issuing through said apertured covering upon the outer surface of the windshield, and a hand-engageable member within reach of the driver for placing the device out of operation.

In testimony whereof I hereunto affix my signature.

WILLIAM H. HEATON.